United States Patent [19]

Crimmins

[11] 3,834,556

[45] Sept. 10, 1974

[54] AIR CUSHION PALLET

[75] Inventor: Arthur G. Crimmins, Wilmington, Del.

[73] Assignee: All American Industries, Inc., Wilmington, Del.

[22] Filed: Feb. 1, 1973

[21] Appl. No.: 328,744

[52] U.S. Cl.............................. 214/1 BE, 180/125
[51] Int. Cl............................................. B65g 61/00
[58] Field of Search.................................. 214/1 BE; 180/115-130

[56] References Cited
UNITED STATES PATENTS

| | | | |
|---|---|---|---|
| 3,124,209 | 3/1964 | Flipse............................ | 214/1 BE X |
| 3,261,177 | 7/1966 | Amann et al.................... | 180/125 X |
| 3,272,359 | 9/1966 | Thomas et al..................... | 214/152 |
| 3,513,934 | 5/1970 | Crowley......................... | 214/1 BE X |

*Primary Examiner*—Frank E. Werner
*Attorney, Agent, or Firm*—Connolly and Hutz

[57] ABSTRACT

A flexible shallow air cushion chamber having valved holes in its upper and lower surfaces provided optional pressurized air cushions between its lower surface and the ground and between it and a load disposed upon its upper surface. Air pressure is optionally supplied to the upper or lower surfaces or to both to facilitate movement over the ground or to slide a load on or off it as required. Air inlet ports are provided through lateral extensions on two sides of the pallet which are grasped by an air-supplying clamp. The inlet ports are check valved, to prevent outward leakage of air if misaligned clamping should occur, by flexible flaps and the lateral sections are reinforced to prevent them from being crushed when they are clamped. The clamp includes a pair of clam shell-shaped jaws with an air hose and traversing rod connected to it. The rod is a handle or a linkage on a forklift truck.

13 Claims, 3 Drawing Figures

PATENTED SEP 10 1974  3,834,556

To Air Supply

AIR CUSHION PALLET

BACKGROUND OF THE INVENTION

Boxed and bagged material are commonly stacked on wooden pallets or cardboard slip sheets to facilitate movement by forklift trucks. Wooden pallets and relatively expensive and seldom can be recovered. Cardboard slip sheets are insubstantial and require a relatively high degree of skill to manipulate by special forklift trucks with an "ice tong" type of extensible clamp and a steel base plate. An object of this invention is to provide an air cushion pallet for stacking and transporting material which is substantial, relatively simple and economical and which facilitates controlled relative movement between the pallet, the ground and a load supported on it.

SUMMARY

Perimetrical sections are provided on one or more sides of a shallow top and bottom air cushioned chamber to provide a grasp for imparting lateral movement to the pallet and a supply of air thereto. Air inlet ports in the perimetrical sections advantageously have movable valve elements in them to prevent air pressure from escaping outwardly if the grasping and air-supplying clamp should be misaligned. Perforated air inlet sheets on two sides of the chamber thus have flexible valve element or flaps attached within them. An internal partitioning sheet divides the chamber into upper and lower portions having separate inlet sections, which may be optionally supplied with air. The pallet is advantageously combined with an air-supplying clamp having laterally elongated jaws which are hinged together in a clam shell construction and arrangement. A rod imparts lateral movement to the clamp and attached pallet in the form of a handle or a movable linkage which is carried on a forklift truck.

BRIEF DESCRIPTION OF THE DRAWINGS

Novel features and advantages of the present invention will become apparent to one skilled in the art from a reading of the following description in conjunction with the accompanying drawings wherein similar reference characters refer to similar parts and in which.

DESCRIPTION OF THE PREFERRED EMBODIMENTS

Figure 1:
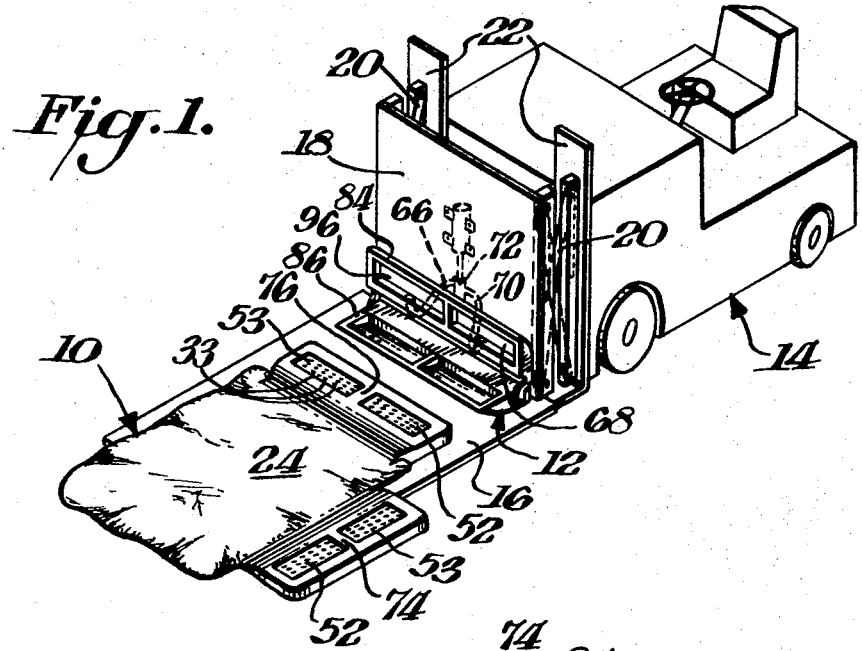
FIG. 1 is a three-dimensional view of one embodiment of this invention in position for engagement by a clamp mounted on a forklift truck.

In FIG. 1 is shown an air cushion pallet 10 in position for engagement by a clam shell-shaped clamp 12 mounted in front of forklift truck 14 above base plate 16. Clamp 12 is attached to the bottom of front plate 18, which is movable out away from and back towards truck 14 by extensible scissors or "ice tong" linkage 20 (not fully shown). Linkage 20 and front plate 16 and base plate 18 are movable up and down on vertical rails 22 mounted in front of truck 14. Details of a forklift truck 14 having base plate 16 and front plate 18, a reciprocal linkage 20, and vertical rails 22 as shown for example in U.S. Pat. Nos. 3,666,128 and 3,640,414.

Figure 2:
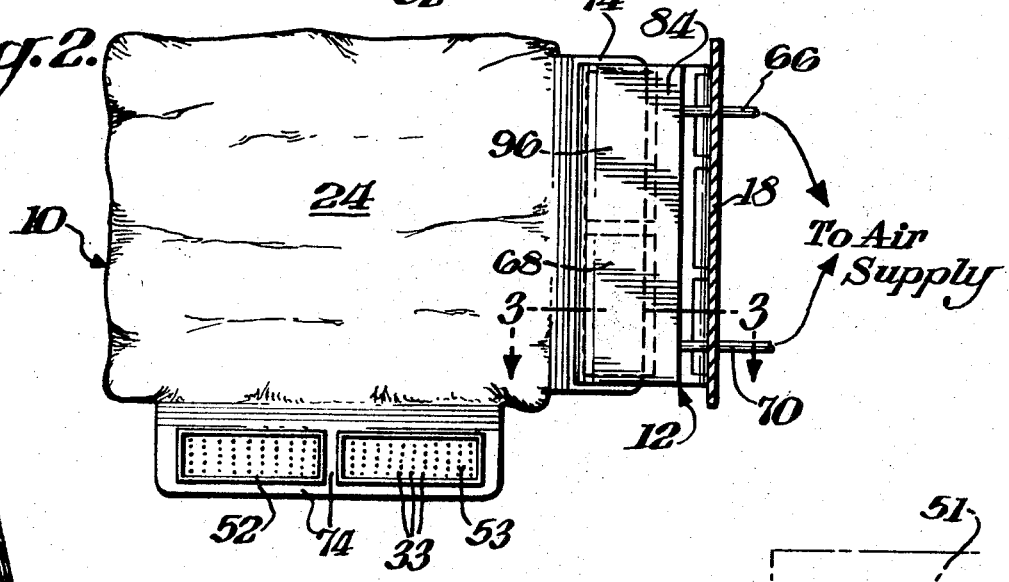
FIG. 2 is a top plan view of the embodiment of this invention shown in FIG. 1 in combination with the clamp of FIG. 1 which is another aspect of this invention.
Figure 3:
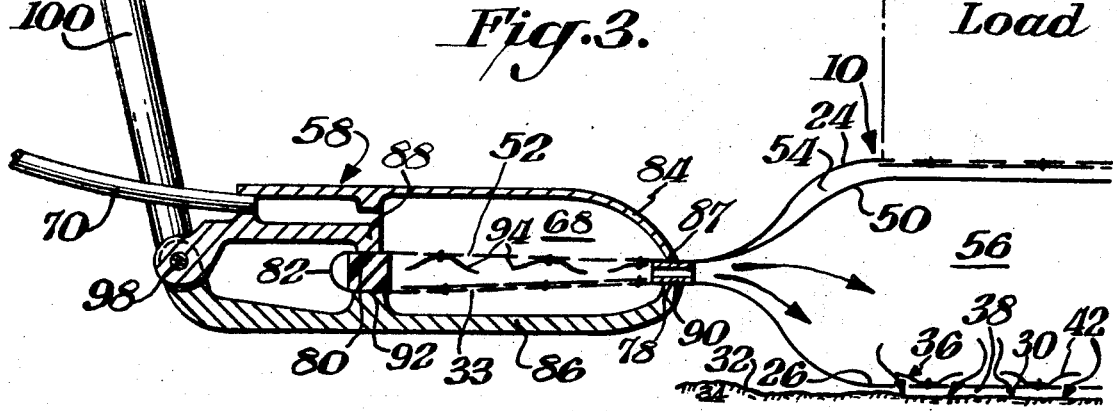
FIG. 3 is a cross-sectional view in elevation taken through FIG. 2 along the line 3—3 in conjunction with a load upon its upper surface and the ground below it.

As shown in FIGS. 1–3, pallet 10, for example, about 3 feet wide and 4 feet long, includes upper wall 24 and lower wall 26, which are in part similar in structure and operation to apparatus described in commonly assigned U.S. Pat. application Ser. No. 250,934, filed May 8, 1972. Upper wall 24 and lower wall 26 are both similar to the lower air cushioned wall of the apparatus shown in FIGS. 1–3 of the aforementioned copending patent application. In that connection, flexible bottom wall 26 includes an array of relatively small holes 30 for example about ⅛ inch in diameter, which are disposed in proximity to external surface 32 of ground 34. Pressurized air in lower chamber 56 communicates through open flapper valve elements 36, within lower chamber 56, to provide air cushions 38 between wall 26 and adjacent relatively flat areas 40 of ground 34. Holes 30 may be larger devices, such as up to ¼ inch diameter for larger pallet sizes. Holes 30 should not, however, be large enough to catch or snag on projections or protrusions.

Flapper valves 36 are for example made of flexible sheets of material 42 secured for example by central glued areas 44 to wall 26 between four surrounding holes 30. Walls 24 and 26 are for example made of a relatively thick and wear-resistant material capable of confining air pressure, such as a coated strong synthetic woven fabric, for example, nylon, dacron or a combination. Walls 24 and 26 also may be made of a strong urethane fabric. Laminated fabrics, such as combinations of lightweight nylon and vinyl films may also be used. Useful types of fabrics are for example those used for industrial outer covers on pallets or storage containers, or for industrial curtains, safety cloth machine covers, pool covers, advertising banners, irrigation ditch liners and windbreaks. Sheets 42 which provide flaps 36 are more flexible and lighter in mass. They are for example provided by strong flexible materials, such as Mylar or other films or fabrics a few thousands of an inch thick. Mylar is the trademark of E. I. duPont de Nemours & Co. for a highly durable transparent, water repellent film of polyethylene terephthalate resin. Sheet materials making up walls 24 and 26 and internal sheets 42 may be of any composition and weight as long as they provide the functional characteristics described herein.

A portion of wall 26 which would be disposed over a depression (not shown) in ground 34 would have a slightly downward bulge (not shown) with flaps 36 being substantially closed (not shown) to obstruct holes 30. This creates a higher differential pressure across holes 30 over a depression which moves flaps 36 into the closed positions over holes 30 to prevent an undue loss of pressure through them. The low mass of flaps 36 facilitates rapid opening and closure and therefore the retention of air pressure within chamber 56 when traversing rough or broken terrain. Flaps 36 only imperfectly seal holes 30 and a small amount of air leaks under them and out of holes 30 even in the closed condition. This unexpectedly facilitates rapid opening of flaps 36 instead of interfering with adjacent operation of valve elements 36 as would be logically anticipated. Flexible flaps 36 of relatively light and flimsy material therefore retain pressure within chamber 14 with remarkable efficiency in conjunction with wall 16 to which they are attached. Relatively rough or broken ground including depressions or even larger holes and gullys may be traversed by a loaded air cushion pallet 10.

Air cushion pallet 10 also has a central internal partition sheet 50 connected between upper wall 24 and lower wall 26 to divide it into upper chamber 54 and lower chamber 56. It is, for example, effectively made of a strong flexible material like that of flap sheets 42, such as Mylar a few mils thick.

In FIG. 3, air inlet port 52 is engaged within clamp 58 to provide air through hose 70 and clamp cavity 68 to lower section or lower chamber 56 below partition sheet 50. No air is being supplied to chamber 54 above partition sheet 50 because the air supply through air tube 66 to clamp cavity 96 is closed off. The supply of air to tubes 66 and 70 is controlled by three-way valve 72 shown in FIG. 1. The air pressure in lower chamber 56 forces partition sheet 50 against upper chamber wall 24 and flap valves 36. The flow of air through holes 30 in bottom wall 26 forms air cushions 38 between bottom wall 26 and the ground 34 as previously described, helps support air pallet 10 and load 51 upon upper wall 24 above the ground, and facilitates lateral traversal over the ground.

Perimetrical sections 74 and 76 extend laterally from air cushion 10 and include inlet ports 52 and 53. Inlet port section 52, shown in FIG. 3, has a substantially strong tube 78 within its junction with lower chamber 56 and a plug 80 of similarly strong and slightly elastic material in its outer end 82. These inserts prevent inlet port section 52 from collapsing when engaged in clamp 58, in particular, between upper jaw 84 and lower jaw 86. Upper jaw 86 has front lip 87 and rear ledge 88 in contact with the top of air inlet port 52 in opposition to front lip 90 and rear ledge 92 of lower jaw 86.

The flow of pressurized air enters into inlet 52 past movable valves or flap elements 94 within inlet port 52 from which it flows through holes 33 and tube 78 into lower chamber 56 of air cushion pallet 10. Adjacent clamp cavity 96 of clamp 58 is connected with air inlet port 53 in a similar manner to that shown with the exception that it is connected to upper chamber 54 instead of lower chamber 56. When air is supplied to clamp cavity 96 through hose 66 and clamp cavity 96, air cushions (not shown) are provided between load 51 and upper wall 54 of air cushion 10 to facilitate sliding load 51 on and off air cushion 10.

Clamp 58 has a clam shell-shape formed by upper jaw 84 and lower jaw 86 which are hinged together at hinge pivot 98. Supply hose 70 is connected to cavity 68 in upper jaw 86 to supply air through port holes 33 into air inlet 52. Handle 100 is connected to clamp 58 for manually traversing it back and forth over the ground together with engaged air cushion pallet 10 and load 51, by virtue of air cushions formed beneath it. When it is desired to dispose pallet 10 in a given location, the supply of air through hose 70 is cut off to drop air cushion 10 and its load on ground 34.

Air cushions (not shown) between load 51 and top surface 24 of air cushion pallet 10 can be provided through hose 66 to clamp cavity 96 and air inlet 53 above partition sheet 50 into upper chamber 54 and out through flaps 36 attached to upper wall 24 in the same manner previously described. This facilitates or lubricates the relative sliding of load 51 off and onto upper wall 24 of air cushion pallet 10. Air inlets 52 and 53 are provided above and below through perimetrical sections 74 and 76 of pallet 10 to permit reversible engagement from either of two sides depending upon the most convenient access to pallet 10. Extensions 74 and 76 including air inlets 52 and 53 are reinforced to resist the lateral pull exerted upon by claimps 12 and 58. The reversibility of engagement provided by upper and lower access to inlets 52 and 53 permits the more extensive wear on the illustrated bottom 26 of pallet 10 to be shared with illustrated upper surface 24.

I claim:

1. An air cushion pallet comprising a chamber having upper and lower walls of substantial area, a source of air pressure, an air inlet on said chamber for connecting it to a source of air pressure to provide a differential of higher pressure in said chamber above atmospheric pressure, an array of relatively small holes in said walls for communicating air pressure from said chamber between said walls and an adjacent external surface whereby a pressurized air cushion is provided between said walls and said adjacent external surface, valve elements disposed within said chamber adjacent said holes, movable means mounting said valve elements for movement from open positions away from said adjacent holes to closed positions in which they substantially obstruct said holes, said valve elements being constructed and arranged to rapidly respond to the pressure differential across said holes whereby they open to transmit said chamber pressure to said pressurized air cushion and close to prevent loss of said air pressure when no external surface and air cushion are disposed adjacent the hole with which said valve element is operatively associated, a perimetrical section on said chamber to provide a grasp for imparting lateral movement to said pallet, said air inlet being disposed within said perimetrical section whereby said pallet may be simultaneously grasped and supplied with air, said air inlet comprising a perforated inlet sheet disposed on said air inlet, and movable valve element means being mounted within said perforated sheet whereby the portion of said perforated sheet not having a supply of inlet air is closed to prevent said air pressure from escaping outwardly through said perforated sheet.

2. An air cushion pallet as set forth in claim 1 wherein said perimetrical sections comprise lateral extensions of said pallet.

3. An air cushion pallet as set forth in claim 2 wherein said lateral extensions are disposed adjacent two side edges of said chamber.

4. An air cushion pallet as set forth in claim 1 wherein an internal tube of substantially strong material is disposed in the junction between said inlet section and said chamber to maintain it open when a clamping force is applied across said inlet section.

5. An air cushion pallet as set forth in claim 4 wherein a plug of substantial strong material is disposed in the outer end of said inlet section for resisting a clamping force imposed across said outer edge.

6. An air cushion pallet as set forth in claim 1 wherein an internal partitioning wall is disposed within said chamber for dividing it into upper and lower chambers, and separate inlet sections being provided for said upper and lower chambers whereby each of them may be optionally supplied with air.

7. An air cushion pallet as set forth in claim 6 wherein said inlet sections are disposed on one surface of one of said walls whereby said air pressure may be provided on one side of said walls.

8. An air cushion pallet as set forth in claim 7 wherein said inlet openings are disposed on both of said walls.

9. An air cushion pallet as set forth in claim 8 wherein a pair of said inlet sections are provided on each of two sides of said chamber to permit said air pressure to be supplied and said pallet to be clamped from each of the two sides of said pallet.

10. An air cushion pallet comprising a chamber having upper and lower walls of substantial area, a source of air pressure, an air inlet on said chamber for connecting it to a source of air pressure to provide a differential of higher pressure in said chamber above atmospheric pressure, an array of relatively small holes in said walls for communicating air pressure from said chamber between said walls and an adjacent external surface whereby a pressurized air cushion is provided between said walls and said adjacent external surface, valve elements disposed within said chamber adjacent said holes, movable means mounting said valve elements for movement from open positions away from said adjacent holes to closed positions in which they substantially obstruct said holes, said valve elements being constructed and arranged to rapidly respond to the pressure differential across said holes whereby they open to transmit said chamber pressure to said pressurized air cushion and close to prevent loss of said air pressure when no external surface and air cushion are disposed adjacent the hole with which said valve element is operatively associated, a perimetrical section on said chamber to provide a grasp for imparting lateral movement to said pallet, said air inlet being disposed within said perimetrical section whereby said pallet may be simultaneously grasped and supplied with air, an air pressure supplying clamp in combination with said pallet, said clamp having movable jaws for engagement on said pallet at said air inlet whereby said pallet is simultaneously grasped and supplied with air, said jaws being laterally elongated for engaging about the outsides of said air inlets, said jaws having a hinged clam shell construction and arrangement, and an air supply conduit being connected to the upper clam shell jaw.

11. An air cushion pallet as set forth in claim 10 wherein a rod is connected to said clamp for imparting said lateral movement to it.

12. An air cushion pallet as set forth in claim 11 wherein said rod comprises a handle.

13. An air cushion pallet as set forth in claim 11 wherein said rod comprises a movable linkage.

* * * * *